United States Patent [19]

Weidner et al.

[11] Patent Number: 5,786,413
[45] Date of Patent: Jul. 28, 1998

[54] ORGANOPOLYSILOXANE RESIN POWDER, PROCESS FOR ITS PREPARATION AND ITS USE IN ORGANOPOLYSILOXANE COMPOSITIONS

[75] Inventors: Richard Weidner, Burghausen; Hermann Blank, Marktl; Volker Frey, Burghausen; Johann Schuster, Emmerting, all of Germany

[73] Assignee: Wacker-Chemie GmbH, Germany

[21] Appl. No.: 589,989

[22] Filed: Jan. 23, 1996

[30] Foreign Application Priority Data

Jan. 24, 1995 [DE] Germany .................. 195 02 034.0

[51] Int. Cl.$^6$ .................................................. C08K 5/54
[52] U.S. Cl. .................. 524/268; 524/588; 524/860; 525/478; 525/474; 528/10; 528/12; 528/15; 528/39; 528/502
[58] Field of Search ................. 524/268, 588, 524/860; 525/478, 474; 528/10, 12, 15, 39, 502

[56] References Cited

U.S. PATENT DOCUMENTS

| | | | |
|---|---|---|---|
| 3,528,940 | 9/1970 | Modic | 260/37 |
| 3,929,704 | 12/1975 | Horning | 260/29.1 SB |
| 4,490,500 | 12/1984 | Smith | 524/378 |
| 4,871,795 | 10/1989 | Pawar | 524/267 |
| 5,057,151 | 10/1991 | Schuster et al. | 106/2 |
| 5,302,685 | 4/1994 | Tsumura et al. | 528/33 |
| 5,319,040 | 6/1994 | Wengrovins et al. | 525/478 |
| 5,359,022 | 10/1994 | Mautner et al. | 528/23 |

FOREIGN PATENT DOCUMENTS

| | | |
|---|---|---|
| 0108208 | 5/1984 | European Pat. Off. |
| 0393426 | 10/1990 | European Pat. Off. |
| 0535687 | 4/1993 | European Pat. Off. |
| 0312949 | 4/1994 | European Pat. Off. |
| 3812415 | 11/1988 | Germany |
| 3839900 | 5/1990 | Germany |
| 9319122 | 9/1993 | WIPO |
| 9323455 | 11/1993 | WIPO |

OTHER PUBLICATIONS

Database WPI, Week 9311, Derwent Publications Ltd. AN 93–088800.

Primary Examiner—Karen A. Dean
Attorney, Agent, or Firm—Brooks & Kushman

[57] ABSTRACT

Organopolysiloxane resin powders having a mean particle diameter (median value $d_{50,3}$) of from 70 to 300 μm and a proportion of resin particles having a diameter <45 μm of less than 5 percent by weight, based on the total weight of the organopolysiloxane resin powder.

9 Claims, 1 Drawing Sheet

ORGANOPOLYSILOXANE RESIN POWDER, PROCESS FOR ITS PREPARATION AND ITS USE IN ORGANOPOLYSILOXANE COMPOSITIONS

FIELD OF INVENTION

The present invention relates to organopolysiloxane resin powder having a low content of fine dust, a process for its preparation and its use in organopolysiloxane compositions.

In the following, the term MQ resins is used to refer to organopolysiloxane resins comprising triorganosiloxy units $\equiv SiO_{1/2}$ (M) and $SiO_{4/2}$ units (Q).

For the purposes of the present invention, the term organopolysiloxane includes oligomeric siloxanes.

BACKGROUND OF INVENTION

Silicone products containing organopolysiloxane resins, in particular MQ resins, are already widely known and have a broad application potential. Thus, organopolysiloxane resins are present, for example, as reinforcing additives in RTV silicone rubber compositions, in embedding compositions for electronic components, as additives for increasing the transparency in hot-crosslinking silicone rubber compositions, as release additives for controlling the release behavior of coatings for the self-adhesive sector, in release agents, in antifoaming agents, in foam stabilizers, in skin care products and in water-repellent impregnation agents.

These silicone products usually contain MQ resins having a molar M/Q ratio of <1 in dissolved form. The MQ resins are customarily prepared in an aromatic solvent such as toluene or xylene.

The silicone products are generally prepared by mixing the toluene or xylene resin solution with the other constituents of the composition so as to obtain better distribution of the resin components and subsequently removing the aromatic solvent, which is to desired in the final formulation, from the mixture by distillation. Reference may be made to U.S. Pat. No. 4,490,500 (General Electric Co.; issued on Dec. 25, 1984). However, in the case of organopolysiloxane compositions containing both low-viscosity constituents and high-viscosity components, the procedure is customarily first to mix the resin solution with the low-viscosity component and to add this mixture, after removal of the aromatic solvent, to the high-viscosity component.

These methods for preparing organopolysiloxane compositions containing organopolysiloxane resin have the disadvantages that a plurality of process stages are necessary, a generally energy-intensive and time-consuming removal of the aromatic solvent is required, generally resulting in a contaminated aromatic solvent, and the silicone compositions may contain a high residual content of aromatic solvent.

Furthermore, there is the possibility of using organopolysiloxane resin in solid form. For this purpose, the resin solutions obtained in the preparation of the resin are customarily substantially freed of aromatic solvent by distillation and are then mixed with the further components of the silicone compositions, which frequently leads to difficulties in the distribution of the resin in the organopolysiloxane composition. Reference may be made, to U.S. Pat. No. 3,929,704 A (General Electric Co.; issued on Dec. 30, 1975).

Solid organopolysiloxane resin is frequently used in the form of powders. These can be produced in a known manner by drying resin solutions. This very often leads to resin powders having a low mean particle diameter and thus a high content of fine dust. Reference may be made, to U.S. Pat. No. 5,302,685 A (Shin-Etsu Chemical Co. Ltd., issued on Apr. 12, 1994), according to which resin powder is prepared by drying a resin solution in toluene. Although these powders have a very low residual solvent content, they have a mean particle diameter of <10 µm and thus a high content of fine dust. U.S. Pat. No. 5,319,040 A (General Electric Co. Ltd; issued on Jun. 7, 1994) describes resin powders having primary particle sizes of from 0.1 to 200 nm and agglomerates of from 10 nm to 200 µm which are prepared by spray drying a resin solution in toluene and have a mean particle diameter of only 18 µm and as a result a high content of fine dust.

Furthermore, EP 535687 A (Wacker-Chemie GmbH; published on Apr. 7, 1993) describes a process for preparing soluble resin powders by precipitation of a resin with water. However, the resulting powders have a mean particle diameter of only about 20 µm and thus a high content of fine dust.

However, powders having a high content of fine dust generally lead to considerable problems in packing, transport, conveying, metering or powder wetting on incorporation into a composition. The product losses associated with dust are not uniform and difficult to control; the powder wetting in the subsequent processing is uncontrolled, in particular there is formation of powder rims on the container walls. Furthermore, fine dust causes an increased safety effort for avoiding or controlling potential dust explosions.

DETAILED DESCRIPTION OF THE PHOTOGRAPH

Figure 1:
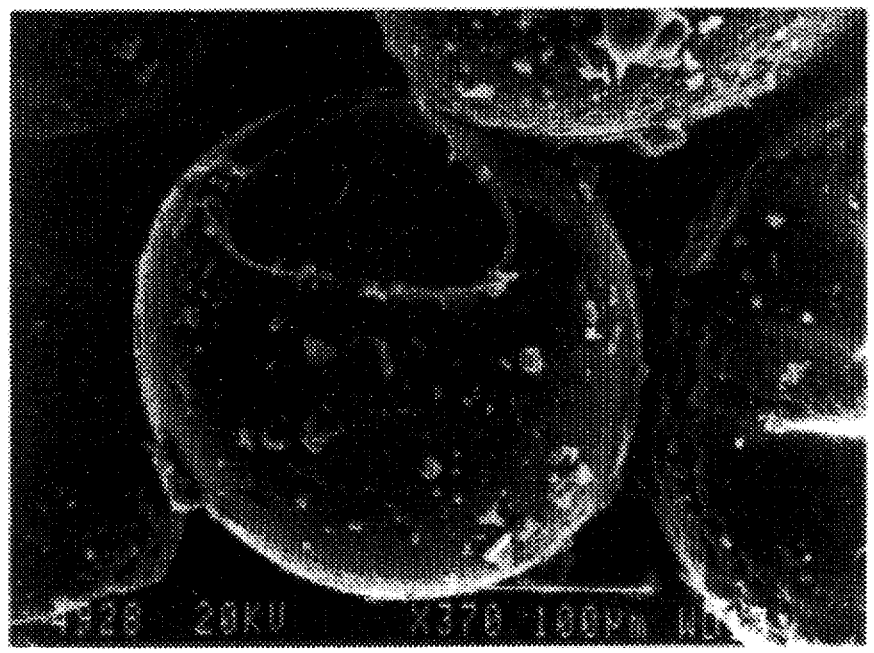

FIG. 1 is a scanning electron micrograph taken at a magnification of 370x, of a resin powder particle prepared according to the invention. The method of preparation is described in example 2.

SUMMARY OF INVENTION

The present invention provides organopolysiloxane resin powders having a mean particle diameter (median value $d_{50,3}$) of from 70 to 300 µm, preferably from 90 to 250 µm, and a proportion of resin particles having a diameter <45 µm of less than 5 percent by weight, preferably less than 4 percent by weight, based on the total weight of the organopolysiloxane resin powder.

The mean particle diameter (median value $d_{50,3}$) is generally determined by sieve analysis and corresponds to the particle diameter at which 50 percent by weight of the powder has a larger diameter and 50 percent by weight of the powder has a smaller diameter. On this subject, reference may be made, in particular, to the German standard DIN 66 141.

For the purposes of the present invention, siloxane resin particles having a diameter of <45 µm are referred to as "fine dust".

The organopolysiloxane resin powders of the present invention have a particle diameter of preferably at most 1000 µm, particularly preferably at most 600 µm.

The organopolysiloxane resin powders of the present invention have a bulk density of preferably from 350 to 600 kg/M³ and particularly preferably from 430 to 600 kg/m³.

The organopolysiloxane resin powders of the present invention have a content of water-insoluble organic solvent of preferably less than 0.15 percent by weight, particularly preferably less than 0.1 percent by weight, in each case based on the total weight of the organopolysiloxane resin powder.

For the purposes of the present invention, the term water-insoluble organic solvents means solvents which are miscible with water to a maximum degree of 1 g/l at room temperature and at the pressure of the surrounding atmosphere.

The organopolysiloxane resin powders of the present invention have a content of Si-bonded hydroxyl groups of preferably less than 0.5 percent by weight, particularly preferably less than 0.45 percent by weight, in each case based on the total weight of the organopolysiloxane resin powder.

The organopolysiloxane resin powders of the present invention are mainly made up of particles having a hollow spherical structure.

The organopolysiloxane resin powders of the present invention are preferably ones comprising $R_3SiO_{1/2}$ (M), $R_2SiO_{2/2}$ (D), $RSiO_{3/2}$ (T) and $SiO_{4/2}$ (Q) units, where R can be identical or different and are each an organic radical or a hydrogen atom, the sum of all D and T units in the resin is at most 30 mol percent and the molar ratio of M to Q units is in the range from 0.5:1 to 1:1.

R is preferably a monovalent hydrocarbon radical having from 1 to 18 carbon atoms or a hydrogen atom, in particular a methyl or vinyl radical or a hydrogen atom.

The organopolysiloxane resin powders of the present invention are particularly preferably MQ resin powders, i.e. those comprising $R_3SiO_{1/2}$ and $SiO_{4/2}$ units and having a molar ratio of M to Q units in the range from 0.5:1 to 1:1, where R is as defined above.

The organopolysiloxane resin powders of the present invention are preferably prepared from resin solutions by spray drying under inert gas. This spray-drying process comprises the production of a primary particle by atomization in combination with agglomeration, classification and further drying.

The present invention further provides a process for preparing the novel organopolysiloxane resin powders by spray drying organopolysiloxane resin solutions, which comprises atomizing a solution of organopolysiloxane resin which is solid at room temperature in an organic solvent at a temperature of from 0° to 100° C. and a pressure of from 1,000 to 30,000 hPa by means of a pressure nozzle at the top of a spray dryer and drying the liquid droplets produced by means of the inert gas which is conveyed in cocurrent and has an inlet temperature of from 100° to 300° C., and producing a fluidized bed from the resin particles thus obtained at the bottom of the spray dryer using a further inert gas stream which is introduced into the dryer from the bottom at an inlet temperature of from 50° to 250° C., by means of which the resin powder is further dried and freed of fine dust by classification, with the fine dust thus separated off being discharged in the upper part of the spray dryer and the resin powder of the present invention being discharged at the lower end of the spray dryer.

Preferably, the fine dust separated off by classification is agglomerated with primary particles in the spray cone or is discharged at the upper end of the spray dryer with the inert gas stream, the fine dust which is discharged being separated from the inert gas, preferably by means of a cyclone or a filter, and being recirculated to the agglomeration zone, i.e. into the spray cone.

The inert gas laden with organic solvent, which gas preferably has a temperature of from 50° to 220° C., particularly preferably from 80° to 160° C., is preferably freed of solvent by cooling, preferably by means of a condenser or scrubber, and is recirculated, preferably after prior heating, to the spray dryer. Organic solvent is here recovered in high purity and is preferably reused directly and without further treatment for the preparation of the organopolysiloxane resin solutions.

The product is discharged at the lower end of the spray dryer by means of discharge devices such as, preferably, flap valves.

For the purposes of the process of the present invention, an inert gas is a gaseous substance which is inert towards the organopolysiloxane resin and the organic solvent. Examples of such gases are nitrogen, argon, helium and $CO_2$, with nitrogen being particularly preferred.

In a preferred embodiment of the process of the present invention, a solution of organopolysiloxane resin which is solid at room temperature in an organic solvent is atomized at a temperature of from 20° to 60° C. and a pressure of from 10,000 to 20,000 hPa by means of a single-fluid pressure nozzle at the top of a spray dryer and the liquid droplets produced are dried by means of the nitrogen stream which is conveyed in cocurrent and has an inlet temperature of from 150° to 250° C., and a fluidized bed is produced from the resin particles thus obtained at the bottom of the spray dryer using a further nitrogen stream which is introduced into the dryer from below at an inlet temperature of from 100° to 200° C., by means of which the resin powder is further dried and freed of fine dust by classification, with the fine dust thus separated off being discharged in the upper part of the spray dryer and the resin powder of the present invention being discharged at the lower end of the spray dryer.

The solutions of organopolysiloxane resin in an organic solvent which are used in the process of the present invention can be previously known resin solutions.

The resin solutions used according to the present invention are preferably those as described in WO 93/23455 (Wacker-Chemie GmbH; published on Nov. 25, 1993) which are prepared by, in a 1st stage, reacting at least one silane of the formula $$R_3SiOR^1 \qquad (I)$$

and/or its hydrolyzate $R_3SiOSiR_3$, where

R is identical or different and are each a monovalent organic radical and $R^1$ is an alkyl radical, and at least one silane of the formula $$Si(OR^2)_4 \qquad (II)$$

and/or its partial hydrolyzate, where $R^2$ is identical or different and are each an alkyl radical, and, optionally, an organosilicon compound selected from the group consisting of silanes of the formula $$R_a^3Si(OR^4)_{4-a} \qquad (III)$$

and/or their partial hydrolyzates, where a is 1 or 2, $R^3$ is identical or different and are each a monovalent organic radical and $R^4$ is identical or different and are each an alkyl radical, and organo(poly)siloxanes of the formula $$(R_2^5SiO)_b \qquad (IV)$$

where $R^5$ is identical or different and are each a monovalent organic radical and b is an integer from 3 to 8, or their mixtures, with water in the presence of acid, thus forming a homogeneous reaction mixture wherein the alcohol formed is at least partially distilled off, in a 2nd stage, reacting the homogeneous reaction mixture obtained in the 1st stage in the presence of base and at least that amount of water-insoluble organic solvent which is sufficient to maintain a homogeneous reaction mixture and removing water and alcohol by distillation, in a 3rd stage, neutralizing the homogeneous reaction mixture obtained in the 2nd stage with acid, distilling off any water and alcohol still present and removing the precipitated salt formed in the neutralization and, optionally in a 4th stage, partially freeing the homogeneous reaction mixture obtained in the 3rd stage of water-insoluble organic solvent.

The resin solutions used according to the present invention are particularly preferably those prepared by, in a 1st stage, forming a homogeneous reaction mixture by mixing hexamethyldisiloxane and/or trimethylethoxysilane, optionally in admixture with 1,3-divinyltetramethyldisiloxane and/or vinyldimethyl-ethoxysilane and tetraethoxysilane and/or its partial hydrolyzate, with water and from 0.2 to 50 mmol of acid, based on 1000 g of the reaction mixture of the 1st stage prior to distillation, reacting them at the boiling point of the reaction mixture and at a pressure between 900 and 1100 hPa and distilling off ethanol formed, in a 2nd stage, reacting the homogeneous reaction mixture obtained in the 1st stage in the presence of base selected from the group consisting of sodium hydroxide, potassium hydroxide and methylamine, and a water-insoluble organic solvent, in particular toluene or xylene, at the boiling point of the homogeneous reaction mixture and at a pressure between 900 and 1100 hPa, with water and ethanol being completely or almost completely distilled off, and, in a 3rd stage, neutralizing the homogeneous reaction mixture obtained in the 2nd stage with acid, optionally distilling off substantially all water and ethanol and filtering off the precipitate salt formed on neutralization.

The solution of organopolysiloxane resin in an organic solvent which is used in the process of the present invention has a resin content of preferably from 30 to 80 percent by weight, particularly preferably from 50 to 75 percent by weight, based on the total weight of the resin solution.

The process of the present invention has the advantage that organopolysiloxane resin powders containing no, or only little, fine dust are obtained.

Furthermore, the process of the present invention has the advantage that the resin powders obtained have, despite the high particle size of the individual resin particles, a uniform spherical structure resulting in excellent flow and transport properties.

The process of the present invention has the advantage that, despite the high particle size, the organopolysiloxane resin powders obtained contain no or very little water-insoluble organic solvent, particularly as a result of the further drying in the fluidized bed.

Furthermore, the process of the present invention has the advantage that the organopolysiloxane resin is not chemically changed during the drying process.

The process of the present invention has the advantage that virtually no product losses occur if the fine dust separated off is recirculated to the agglomeration zone.

The organopolysiloxane resin powders of the present invention or prepared according to the present invention have the advantage that they dissolve, completely, at a very high dissolution rate in organic solvents and in liquid organosilicon compounds, including those having a relatively high viscosity.

The organopolysiloxane resin powders of the present invention or prepared according to the present invention are suitable for all applications for which organopolysiloxane resins can be used. In particular, they are suitable for preparing organopolysiloxane compositions containing organopolysiloxane resin.

The present invention further provides a process for preparing organopolysiloxane compositions, which comprises mixing organopolysiloxane resin powder of the present invention with organosilicon compound and, if desired, further components.

The organosilicon compound with which the resin powder of the present invention is mixed is preferably an organopolysiloxane having a viscosity of from 10 to $50 \cdot 10^6$ mm$^2$/s at 25° C., for example α,ω-dihydroxypolydimethylsiloxanes, α,ω)-trimethylsiloxypolydimethylsiloxanes, α,ω-divinylpolydimethylsiloxanes, α,ω-divinylpoly(dimethyl/methylvinyl)siloxanes, α,ω-trimethylsiloxypoly(dimethyl/methylvinyl)siloxanes, α,ω-dihydrogenpolydimethylsiloxanes, α,ω-dihydrogenpoly(dimethyl/methylH)siloxanes and α,ω-trimethylsiloxypoly(dimethyl/methyl-H)siloxanes.

This preferably gives mixtures in which the organopolysiloxane resin of the present invention is dissolved in molecularly dispersed form.

Examples of organopolysiloxane compositions which can be prepared by the process of the present invention are compositions based on diorgano-polysiloxanes which cure to give elastomers, such as RTV and hot-crosslinking silicone rubber compositions, addition-cross linking, condensation-cross linking and peroxidically crosslinking single-component and two-component silicone rubber compositions. Further examples of such compositions are embedding compositions for electronic components, coatings for the self-adhesive sector, release agents, antifoaming agents, foam stabilizers, personal care products and water-repellent impregnation agents. Organopolysiloxane compositions containing organopolysiloxane resin are widely known. Reference may be made, to U.S. Pat. No. 3,528,940, EP-A 393 426, U.S. Pat. No. 4,871,795 or the corresponding DE-A 38 12 415, U.S. Pat. No. 4,490,500, GB-A 1 055 777, WO 93/19122, EP-A 108 208 and EP-B 312 949.

The resin powder used in the process of the present invention is preferably an MQ resin powder of the present invention.

The organopolysiloxane resin powders of the present invention can be mixed with all silicone raw materials, fillers, catalysts and additives which have hitherto been used for preparing known organopolysiloxane compositions containing silicone resin.

In the process of the present invention for preparing organopolysiloxane compositions, the organopolysiloxane resin powder used according to the present invention can be mixed with the other constituents in any desired way.

Preferably, the resin powder of the present invention is dissolved in the organosilicon compound and is then mixed with the remaining components.

Because of the excellent solubility of the organopolysiloxane resin powders of the present invention, the resin-containing organopolysiloxane compositions can be prepared according to the present invention using all mixing equipment which has hitherto been used for this purpose. Such equipment includes, inter alia, agitators having conventional stirrer designs, kneaders such as trough and double-trough kneaders, single-screw and twin-screw kneaders, single-shaft and double-shaft kneaders, dump kneaders, paddle mixers, compounders, roll mills, homogenizing and dispersing machines according to the rotor-stator principle, single-screw and twin-screw extruders and Roots pump machines.

Depending on the mixing equipment used, the process of the present invention for preparing the resin-containing organopolysiloxane compositions can be carried out continuously or batchwise.

In the process of the present invention for preparing organopolysiloxane compositions, the mixing of the individual components is preferably carried out at a pressure between 900 and 1100 hPa and a temperature of from 0° to 250° C. If in the process of the present invention organopolysiloxane resin is to be dissolved in a high-viscosity organosilicon compound, i.e. an organosilicon compound having a viscosity of preferably from 10,000 to 50·10$^6$ mm$^2$/s at 25° C., this is particularly preferably carried out at from 900 to 1100 hPa and a temperature of from 50° to 200° C.

The process of the present invention has the advantage that organopolysiloxane compositions containing completely dissolved organopolysiloxane resin can be prepared very economically and with high flexibility in a very simple way and in a very short time merely by mixing.

Furthermore, the process of the present invention has the advantage that it gives organopolysiloxane compositions containing siloxane resin powder completely dissolved in molecularly dispersed form without residues of solid, undissolved siloxane resin particles. The complete solubility is advantageous particularly in the case of high-viscosity siloxane compositions, since these can no longer be filtered.

Furthermore, for many of the organopolysiloxane compositions prepared according to the present invention it is advantageous that the organopolysiloxane resin powders of the present invention contain no, or only very little, residual solvent and no, or only a low proportion of, Si-bonded hydroxyl groups.

The organopolysiloxane resin powders of the present invention can, of course, also be redissolved in an organic solvent. This enables the preparation in a very simple manner of organopolysiloxane resin solutions having a desired concentration even in a solvent in which the resin synthesis cannot be carried out or is customarily not carried out. Examples of such solvents are solvents which are not stable in the alkaline region, for example esters such as dioctyl adipate and dioctyl phthalate.

In the following examples all parts and percentages are, unless otherwise indicated, by weight. Unless otherwise indicated, the following examples are carried out at the pressure of the surrounding atmosphere, i.e. at about 1000 hPa, and at room temperature, i.e. at about 20° C., or at the temperature which becomes established on combining the reactants at room temperature without additional heating or cooling. All viscosities given in the examples are at a temperature of 25° C.

The mean particle diameters ($d_{50,3}$) are determined as follows: the amount of material retained on the test sieve having a wire mesh screen in accordance with DIN 4188, part 1 after manual or mechanical sieving in accordance with DIN 1164, part 4 is determined by weighing. The test particle sizes are selected in accordance with DIN 66100. The evaluation of the sieve analyzes and determination of the median value is carried out in accordance with DIN 66141.

The determination of the minimum ignition energy using inductance is carried out in a modified Hartmann apparatus. This is a vertical tube, open at the top, of transparent plastic and having a volume of 1.3 l. The powder sample is placed in a heap on the bottom and is brought into suspension by an air pulse. The ignition source is provided by the spark discharge of a high-voltage capacitor (U=6–10 kV, C=20 pF to 0.1 µF, E=0.2 mJ to 5 J) via a three-electrode spark path which is arranged in the upper third of the tube. The spark discharge is triggered via the third, so-called auxiliary, electrode by means of an auxiliary spark (E=0.2 mJ) at a defined point in time. The duration of the spark between the two main electrodes (spacing 4–6 mm) is determined not only by the capacitance but also by an inductance of about 0.9 mH in the main discharge circuit. The ignition behavior is assessed visually. Ignitions are considered to be those reactions in which the entire volume of the tube is filled with flame. The ignition energy is, starting from an energy value at which ignition is to be expected, decreased in steps until ignition no longer occurs in twenty successive tests regardless of the dust concentration. The minimum ignition energy $E_{min}$ is thus between the highest energy $E_1$ at which no ignitions occur and the lowest energy $E_2$ at which ignition still occurs every time. The minimum ignition energy $E_{min}$ obeys the following inequality: $E_1 < E_{min} < E_2$.

The iodine number is the number which indicates how many g of iodine are bound by 100 g of the substance being examined.

In the following examples, Shore A hardness is determined in accordance with DIN (German Standard) 53 505-87, the tear strength, the elongation at break and the modulus (tensile strength after 100% elongation) are each determined in accordance with DIN 53504-85S1 and the tear propagation resistance is determined in accordance with ASTM D624B-73, form B.

EXAMPLE 1

A 70% strength solution in toluene of an MQ resin comprising $(CH_3)_3SiO_{1/2}$ and $SiO_{4/2}$ units in a molar ratio of 0.65:1 is prepared by the process described in WO 93/23455. Data on the resin solution $V_A$ are shown in Table 1.

This resin solution is atomized by means of a single-fluid pressure nozzle (nozzle head model: ST 1278-SS, orifice insert type: SIT 55, core type: SIT 68 from Spraying Systems Deutschland GmbH, Hamburg) at a feed pressure of 17,000 hPa into a conical spray dryer (total height: 3.8 m; height to the cone: 2 m, internal diameter: 2 m, internal diameter at the lower end: 0.25 m; internal volume 8.3 m$^3$) at a feed throughput of 40 kg/hour in a stream of nitrogen (625 kg/hour; inlet temperature 190° C.). The resulting resin powder forms, together with the nitrogen stream which is introduced at the lower end of the dryer (120 kg/hour; inlet temperature: 160° C.), a fluidized bed in which the resin particles are further dried. At the same time, fine dust is carried out at the upper end of the dryer by the toluene-laden drying gas at an outlet temperature of 120° C., separated from the inert gas in a jet filter and pneumatically recirculated by means of nitrogen to the spray cone of the pressure nozzle where agglomeration onto moist primary particles takes place. Recirculation of the fine dust fraction avoids a product loss. Powder is discharged continuously from the fluidized bed at the lower end of the dryer by means of an overflow weir and double flap valve. The drying gas laden with toluene is freed of toluene in a wet scrubber (gas outlet temperature: −8° C.) and after prior heating to 190° C. is recirculated to the process. In this manner, toluene is recovered completely and can be reused for the resin synthesis.

The free-flowing resin powder A thus obtained has a mean particle diameter ($d_{50}$ value) of 190 µm, a bulk density of 510 kg/M$^3$ and a mean toluene content of 0.09%, based on the weight of the resin powder. The toluene content is determined by drying a sample at 105° C. for a period of 2 hours.

The minimum ignition energy using inductance is between 25 and 50 mJ.

Sieve analysis gives the following particle size distribution:

Resin powder A

| Fraction [µm] | <500 | <355 | <250 | <180 | <125 | <90 | <63 | <45 |
|---|---|---|---|---|---|---|---|---|
| Amount [%] | 98.8 | 96 | 71 | 47 | 21 | 12 | 3 | 0.1 |

Resin powders A directly after the drying process and after storage for 1 year are each dissolved in toluene in a weight ratio of 1:1 and the solutions obtained are characterized. The data are shown in Table 1.

EXAMPLE 2

The procedure described in Example 1 is repeated except that the resin solution $V_A$ is replaced by a 70% strength toluene solution of an MQ resin comprising (CH$_3$)$_3$SiO$_{1/2}$, (CH$_3$)$_2$(CH$_2$=CH)SiO$_{1/2}$ and SiO$_{4/2}$ units in a molar ratio of 0.70:0.10:1, which is likewise prepared by the process described in WO 93/23455. Data on the resin solution $V_B$ are shown in Table 1.

The free-flowing resin powder B thus obtained has a mean particle diameter ($d_{50}$ value) of 155 µm, a bulk density of 460 kg/m$^3$ and a mean toluene content of 0.07%, based on the weight of the resin powder. The toluene content is determined by drying a sample at 105° C. for a period of 2 hours.

The minimum ignition energy using inductance is between 13 and 25 mJ.

Sieve analysis gives the following particle size distribution:

Resin powder B

| Fraction [µm] | <500 | <355 | <250 | <180 | <125 | <90 | <63 | <45 |
|---|---|---|---|---|---|---|---|---|
| Amount [%] | 100 | 99.4 | 89 | 62 | 35 | 18 | 6 | 2 |

FIG. 1 shows the scanning electron micrograph of resin powder B (magnification: 370x)

Resin powders B directly after the drying process and after storage for 1 year are each dissolved in toluene in a weight ratio of 1:1 and the solutions obtained are characterized. The data are shown in Table 1.

TABLE 1

| | Viscosity [mm$^2$/s] | Content of Si-bonded hydroxyl groups [%] | Iodine number |
|---|---|---|---|
| Resin solution $V_A$[1] | 3.94 | 0.17 | — |
| Resin solution $V_B$[1] | 3.04 | 0.20 | 9.2 |
| Resin powder A[2] | 3.92 | 0.17 | — |
| Resin powder B[2] | 3.05 | 0.21 | 9.2 |
| Resin powder A[3] | 3.95 | 0.16 | — |
| Resin powder B[3] | 3.03 | 0.19 | 9.1 |

[1] The 70% strength resin solution is diluted with toluene to a resin content of 50% and is then analyzed.
[2] The resin powder is dissolved in toluene immediately after drying in a ratio of 1:1 and is then analyzed.
[3] The resin powder is dissolved in toluene after storage for 1 year in a ratio of 1:1 and is then analyzed.

COMPARATIVE EXAMPLE 1

A resin powder comprising (CH$_3$)$_3$SiO$_{1/2}$ and SiO$_{4/2}$ units in a molar ratio of 0.65:1 is prepared by the process described in the above-discussed EP 535 687 A.

The resin powder $V_c$ has a mean diameter ($d_{50}$ value) of 11 µm, a bulk density of 410 kg/m$^3$ and a mean residual solvent content, i.e. water and tetrahydrofuran, of 0.6%, based on the weight of the resin powder. The residual solvent content is determined by drying a sample at 150° C. for a period of 2 hours.

The minimum ignition energy using inductance is less than 1 mJ.

Sieve analysis gives the following particle size distribution:

Resin powder $V_c$

| Fraction [µm] | <125 | <71 | <63 | <32 | <20 |
|---|---|---|---|---|---|
| Amount [%] | 97 | 88 | 87 | 82 | 72 |

EXAMPLE 3

The resin powder A prepared in Example 1 and the resin powder $V_c$ described in Comparative Example 1 are then each packed, stored, conveyed and metered on an industrial scale. Bulk powder properties of the resin powder A of the present invention in comparison with resin powder $V_c$ are shown in Table 2.

TABLE 2

| Resin powder | Poured angle in degrees[1] | Flow factor FF$_c$[2] (20° C.) | Flow behavior[3] |
|---|---|---|---|
| A | 35 | 11,437 | readily to free flowing |
| $V_c$ | 45–50 | 2,346 | cohesive to very cohesive, caking, bridge-space and channel-forming |

[1] Angle to the horizontal of the poured cone after free pouring out. The lower the poured angle, the better the powder flow.
[2] Ratio of the consolidation stress acting on the powder sample to the resulting powder strength (compressive strength) under a load of 5 kpa. The flow factor is evaluated as follows:

TABLE 2-continued

| Measured flow factor FF$_c$ | Flow properties of the sample |
|---|---|
| 1 to 2 | flows with great difficulty, very cohesive |
| 2 to 4 | flows with difficulty, cohesive |
| 4 to 10 | flows readily |
| >10 | flows freely |

[3]visual assessment

The very low content of fine dust in the resin powder A of the present invention has the following consequences in terms of packing, storage, conveying and metering behavior:

Packing

In contrast to resin powder $V_c$, resin powder A can be packed in a free-fall bagging plant (parameters determined: 1200 kg per hour throughput, metering time 40 seconds, degree of filling 85% for 20 kg sack).

Storage

Resin powder A can be discharged using conventional discharge devices, such as cellular wheel sluices.

Conveying

Owing to the high content of fine dust, resin powder $V_c$ leads, in contrast to resin powder A, to wall deposits and thus to a higher danger of blockages in pipes during pneumatic conveying.

Metering

In contrast to resin powder A, the resin powder $V_c$ is bridge-forming in the static state and in the moving state shoots forward, which causes great complication in fine metering.

EXAMPLE 4

In each case, a defined amount $m_1$ of a) an isoparaffinic hydrocarbon mixture having a viscosity of 1.53 mPas (commercially available under the name "Isopar L" from Silbermann, Gablingen), b) a dioctyl adipate having a viscosity of 14 mm$^2$/s (commercially available from Hüls AG, Marl), c/d) an α,ω-divinylpolydimethylsiloxane having a viscosity of 510 mm$^2$/s, e) an α,ω-divinylpolydimethylsiloxane having a viscosity of 20,000 mm$^2$/s or f) an α,ω-divinylpolydimethylsiloxane having a viscosity of 96,400 mm$^2$/s is placed in a 1000 ml glass flask fitted with a glass blade stirrer and is heated while stirring (750 revolutions per minute) to a temperature $T_1$. Subsequently, a defined amount $m_2$ of resin powder A whose preparation is described in Example 1 or of resin powder B whose preparation is described in Example 2 is measured in over a defined time $t_1$, while stirring. The mixture is then stirred further at the temperature specified until a completely homogeneous mixture is obtained, with the time $t_2$ required for this purpose being determined.

The viscosity of the mixtures obtained is determined immediately after preparation $v_1$ and after storage for 4 weeks at 25° C. $v_2$.

In all cases this gives a transparent mixture in which the resin has completely dissolved without residues of particles.

The results are shown in Table 3.

TABLE 3

| Example | Resin powder | m$_1$ [g] | m$_2$ [g] | t$_1$ [min] | T$_1$ [°C.] | t$_2$ [min] | v$_1$ [mm$^2$/s] | v$_2$ [mm$^2$/s] |
|---|---|---|---|---|---|---|---|---|
| 4a | A | 350 | 350 | 2 | 25 | 15 | 22.3 | 22.2 |
| 4b | A | 350 | 350 | 2 | 60 | 15 | 304 | 303 |
| 4c | B | 300 | 200 | 1.5 | 100 | 15 | 2590 | 2595 |
| 4d | A | 300 | 200 | 1.5 | 100 | 45 | 12050 | 12070 |
| 4e | B | 300 | 200 | 2 | 120 | 15 | 26200 | 26195 |
| 4f | B | 300 | 200 | 7 | 120 | 25 | 76125 | 76300 |
| C2a | V$_D$ | 300 | 200 | 2 | 120 | 15 | 26250 | 26255 |
| C2b | V$_D$ | 300 | 200 | 7 | 120 | 23 | 76140 | 76160 |

COMPARATIVE EXAMPLE 2

The procedure described in Example 4 is repeated except that resin powder $V_D$ is used in place of resin powder A or B and is mixed with a) α,ω-divinylpolydimethylsiloxane having a viscosity of 20,000 mm$^2$/s or b) α,ω-divinylpolydimethylsiloxane having a viscosity of 96,400 mM$^2$/s.

Resin powder $V_D$ is the fine dust carried out with the nitrogen stream and separated off by means of a cyclone in the preparation of resin powder B as described in Example 2. According to an electron-microscopic examination, resin powder $V_D$ has a maximum particle size of 50 μm.

In both cases this gives a transparent mixture in which the resin has completely dissolved without residues of particles.

The results are shown in Table 3.

EXAMPLE 5

The procedure described in Example 4 is repeated except that resin powder A or B is added to a) αa,ω-trimethylsiloxypolydimethylsiloxane having a viscosity of 245 mm$^2$/s, b/c) α,ω-trimethylsiloxypolydimethylsiloxane having a viscosity of 101,000 mm$^2$/s or d/e) α,ω-dihydroxypolydimethylsiloxane having a viscosity of 76,800 mm$^2$/s.

In all cases this gives a transparent mixture in which the resin has completely dissolved without residues of particles.

The results are shown in Table 4.

TABLE 4

| Example | Resin powder | m$_1$ [g] | m$_2$ [g] | t$_1$ [min] | T$_1$ [°C.] | t$_2$ [min] | v$_1$ [mm$^2$/s] | v$_2$ [mm$^2$/s] |
|---|---|---|---|---|---|---|---|---|
| 5a | A | 300 | 200 | 1.5 | 100 | 20 | 5840 | 5860 |
| 5b | B | 300 | 200 | 6.5 | 120 | 30 | 62000 | 62300 |
| 5c | B[1] | 300 | 200 | 6.5 | 120 | 30 | 61970 | 62050 |
| 5d | A | 350 | 150 | 4 | 150 | 30 | 81500 | — |
| 5e | B | 300 | 200 | 6.5 | 120 | 30 | 71600 | — |

[1]after storage of the powder for 1 year at 25° C.

COMPARATIVE EXAMPLE 3

In each case, a defined amount $m_1$ of a) a dioctyl adipate having a viscosity of 14 mm$^2$/s (commercially available from Hüls AG, Marl), b) an α,ω-divinylpolydimethylsiloxane having a viscosity of 510 mm$^2$/s, c) an α,ω-divinylpolydimethylsiloxane having a viscosity of 20,000 mm$^2$/s d) an α,ω-divinylpolydimethylsiloxane having a viscosity of 96,400 mm²/s, e) an α,ω-trimethylsiloxypolydimethylsiloxane having a viscosity of 245 mm²/s or f/g) an α,ω-dihydroxypolydimethylsiloxane having a viscosity of 76,800 mm²/s, is mixed with that amount of a 70% strength solution in toluene of an MQ resin comprising $(CH_3)_3SiO_{1/2}$ and $SiO_{4/2}$ units as described in Example 1 (resin solution $V_A$) or a 70% strength solution in toluene of an MQ resin comprising $(CH_3)_3SiO_{1/2}$, $(CH_3)_2(CH_2=CH)SiO_{1/2}$ and $SiO_{4/2}$ units as described in Example 2 (resin solution $V_B$) which corresponds to the amount of resin shown under $m_2$ in Table 5. Toluene is subsequently removed from the mixture obtained at a temperature of 150° C. and a pressure of 5 hPa.

The viscosity of the mixtures obtained is determined immediately after preparation $v_1$ and after storage for 4 weeks at 25° C. $v_2$.

In all cases this gives a transparent mixture in which the resin has dissolved completely without residues of particles.

The results are shown in Table 5

TABLE 5

| Example | Resin solution | $m_1$ [g] | $m_2$ [g] | $v_1$ [mm²/s] | $v_2$ [mm²/s] |
|---|---|---|---|---|---|
| C3a | $V_A$ | 350 | 350 | 302 | 302 |
| C3b | $V_B$ | 300 | 200 | 2585 | 2589 |
| C3c | $V_B$ | 300 | 200 | 26165 | 26170 |
| C3d | $V_B$ | 300 | 200 | 76090 | 76100 |
| C3e | $V_A$ | 300 | 200 | 5815 | 5810 |
| C3f | $V_A$ | 350 | 150 | 81370 | — |
| C3g | $V_B$ | 300 | 200 | 71390 | — |

EXAMPLE 6

In each case, a defined amount $m_1$ of a/b) an α,ω-divinylpolydimethylsiloxane having a viscosity of 96,400 mm²/s, c/d) an α,ω-divinylpolydimethylsiloxane having a viscosity of 652,000 mm²/s or e) a solid α,ω-dihydroxypolydimethylsiloxane having a Brabender plasticity of 4,520 Nm is initially charged, a defined amount $m_2$ of resin powder A whose preparation is described in Example 1 or of resin powder B whose preparation is described in Example 2 is metered in over a defined time $t_1$ and mixed with the polydimethylsiloxane at a temperature of 25° C. while kneading (laboratory kneader from Werner & Pfleiderer, model LUK 075 TV; kneader setting 2). The mixture is subsequently kneaded for 2 hours at a heating range of 0.7° C./min. The internal temperature is 110° C. after 2 hours.

The viscosity of the mixtures obtained is determined immediately after preparation $v_1$ and after storage for 4 weeks at 25° C. $v_2$.

In all cases this gives a transparent mixture in which the resin has dissolved completely without residues of particles.

The results are shown in Table 6.

TABLE 6

| Example | Resin powder | $m_1$ [g] | $m_2$ [g] | $t_1$ [min] | $v_1$ [mm²/s] | $v_2$ [mm²/s] |
|---|---|---|---|---|---|---|
| 6a | B | 300 | 200 | 6 | 76150 | 76100 |
| 6b | A | 350 | 150 | 5 | 99200 | 99700 |

TABLE 6-continued

| Example | Resin powder | $m_1$ [g] | $m_2$ [g] | $t_1$ [min] | $v_1$ [mm²/s] | $v_2$ [mm²/s] |
|---|---|---|---|---|---|---|
| 6c | A | 325 | 175 | 6 | 710000 | 735000 |
| 6d | B | 250 | 250 | 8 | 932000 | 940000 |
| 6e | A | 250 | 250 | 10 | — | — |
| C4 | $V_D$ | 250 | 250 | 8 | 910000 | 925000 |

COMPARATIVE EXAMPLE 4

The procedure described in Example 6 is repeated except that resin powder $V_D$ which is described in more detail in Comparative Example 2 is used in place of resin powder A or B and is mixed with α,ω-divinylpolydimethylsiloxane having a viscosity of 652,000 mm²/s.

This gives a transparent mixture in which the resin has completely dissolved without residues of particles.

The results are shown in Table 6.

EXAMPLE 7

Foam Stabilizer 2 g of the mixture of resin powder A and dioctyl adipate obtained in Example 4b, which has a residual toluene content of 0.045%, are beaten into a foam with 200 g of dioctyl phthalate in a 500 ml steel beaker by means of a laboratory dissolver at 1,000 rpm for a period of 10 minutes.

For comparison, 2 g of the mixture of resin solution $V_A$ and dioctyl adipate obtained in Comparative Example C3a, which has a residual toluene content of 0.25% according to ¹H-NMR examination, is treated as above.

Table 7 shows the foam densities directly after preparation and after resting for 10 minutes.

TABLE 7

| Mixture according to | Foam density [g/ml] | |
|---|---|---|
| | after preparation | after 10 minutes |
| Example 4b | 0.64 | 0.64 |
| Comparative Example C3a | 0.65 | 0.64 |

EXAMPLE 8

Foam Stabilizer

With addition of 3 parts of the mixture of resin powder A and dioctyl adipate obtained in Example 4b, which has a residual toluene content of 0.045%, 186 parts of a polyvinyl chloride-containing paste are foamed by means of a Hansa mixer.

For comparison, the above procedure is repeated with addition of 3 parts of the mixture of resin solution $V_A$ and dioctyl adipate obtained in Comparative Example C3a, which has a residual toluene content of 0.25% according to ¹H-NMR examination.

Both resin mixtures gave identical wet foam densities of 0.62 g/ml.

EXAMPLE 9

Addition-crosslinking Release Coating

A mixture of 100 parts of the mixture prepared in Example 4c from resin powder B and α,ω-divinylpolydimethylsiloxane having a viscosity of 510 mm$^2$/s and a residual toluene content of 0.028%, 4.2 parts of an α,ω-trimethylsiloxypolymethylhydrogensiloxane having a viscosity of 25 mm$^2$/s, 0.25 parts of ethynylcyclohexanol and platinum in the form of a platinum-1,3-divinyl-1,1,3,3-tetramethyldisiloxane complex in such an amount that the total mixture has a platinum content, based on elemental platinum, of 100 ppm, is prepared.

This mixture is applied by means of a metal drawing bar (hand doctor blade) to glassine paper having a weight of 65 g/m$^2$ in such a way that the weight applied is 1.5 g/m$^2$. The paper thus coated is then cured in a circulated air drying oven for 10 seconds at 150° C. Separate pieces of the coated paper were then covered with one of the rubber adhesives "T-4154" and "K-7476" or the acrylic adhesive "A-7475" (in each case commercially available from Beiersdorf, D-Hamburg). The laminates are subsequently aged and tested in accordance with FINAT test no. 10. The results are shown in Table 8.

TABLE 8

|  | Separation values [cN/cm*] | | |
|---|---|---|---|
| Adhesive | "T = 4154" | "K-7476" | "A-7475" |
| Example 9 | 43.7 | 28.8 | 37.7 |
| Comparative Example 5 | 43.5 | 28.2 | 38.1 |

*at a pull-off speed of 300 mm/minute.

COMPARATIVE EXAMPLE 5

Addition-crosslinking Release Coating

The procedure described in Example 9 is repeated except that the 100 parts of the mixture prepared in Example 4c is replaced by 100 parts of the mixture prepared in Comparative Example C3b from resin solution V$_B$ and α,ω-divinylpolydimethylsiloxane having a viscosity of 510 mm$^2$/s, which has a residual toluene content of 0.3% according to $^1$H-NMR measurements. The results are shown in Table 8.

EXAMPLE 10

Addition-crosslinking 2-component System

Using the procedure described in Example 4, a mixture of 30% of resin powder B and 70% of an α,ω-divinylpolydimethylsiloxane having a viscosity of 20000 mm$^2$/s is prepared. The mixture, which has a viscosity of 22,150 mm$^2$/s and a residual toluene content of 0.021%, is admixed with platinum in the form of a platinum-1,3-divinyl-1,1,3,3-tetramethyldisiloxane complex in such an amount that the resulting platinum content, based on elemental platinum, is 10 ppm (composition I).

9 parts of the above described composition I are mixed with one part of a composition II which is prepared by mixing 84.5 parts of an α,ω-trimethylsiloxypoly(dimethyl/methylhydrogen)siloxane having a content of Si-bonded hydrogen of 0.4% and a viscosity of 30 mm$^2$/s, 7.5 parts of an α,ω-divinylpolydimethylsiloxane having a viscosity of 980 mm$^2$/s, 7.5 parts of an α,ω-dihydrogenpolydimethylsiloxane having a viscosity of 1030 mm$^2$/s and 0.2 parts of ethynylcyclohexanol.

The mixture thus obtained is subsequently vulcanized for a period of one hour at 150° C. and the vulcanizate is examined. The results are shown in Table 9.

TABLE 9

| Vulcanisate from | Shore A hardness | Transmission in [%]* |
|---|---|---|
| Example 10 | 50 | 91 |
| Comparative Example 6 | 49 | 91 |

*determined on the compositions I for the respective vulcanizates at a wavelength of 700 nm (Spectronic 21 MV from Bausch & Lomb)

COMPARATIVE EXAMPLE 6

Addition-crosslinking 2-component System

Using the procedure described in Comparative Example 3, resin solution V$_B$, α,ω-divinylpolydimethylsiloxane having a viscosity of 20,000 mm$^2$/s and platinum in the form of a platinum-1,3-divinyl-1,1,3,3-tetramethyldisiloxane complex are used to prepare a mixture whose composition corresponds to the composition I described in Example 10 (composition I). The composition I thus prepared has a viscosity of 22010 mm$^2$/s and a residual toluene content of 0.7% determined by $^1$H-NMR.

9 parts of this composition I are treated as described in Example 10. The results are shown in Table 9.

EXAMPLE 11

Filler-containing, Addition-crosslinking Two-component System, e.g. for Molding or Coating 243 g of an α,ω-divinylpolydimethylsiloxane having a viscosity of 20,000 mm$^2$/s are placed in the kneader described in Example 6. 186 g of a hydrophobic, pyrogenic silica having a carbon content of 4.2% (prepared by the process described in DE-A 38 39 900 or the corresponding U.S. Pat. No. 5,057,151) are then metered in over a period of 5 minutes and during this procedure mixed with the siloxane at 25° C. by kneading. The mixture is subsequently kneaded for 70 minutes with simultaneous heating, the final temperature being 150° C. The heating is then switched off and the mixture is admixed with a further 221 g of the abovedescribed siloxane, kneaded further for 20 minutes and finally degassed at a pressure of 300 hPa. The composition obtained has a viscosity of 521,000 mm$^2$/s. 52 parts of the composition thus obtained are mixed with 31 parts of the mixture obtained in Example 4e from resin powder B and α,ω-divinylpolydimethylsiloxane having a viscosity of 20,000 mm$^2$/s, which has a residual toluene content of 0.028%, 16 parts of an α,ω-divinylpolydimethylsiloxane having a viscosity of 20,000 mm$^2$/s, 0.5 parts of an inhibitor for regulating the pot life and platinum in the form of a platinum-1,3-divinyl-1,1,3,3-tetramethyldisiloxane complex in such an amount that the resulting platinum content is 20 ppm, based on elemental platinum, with the mixture having a viscosity of 101,000 mm$^2$/s and a residual toluene content of 0.009% (composition I).

10 parts of this composition I are mixed with one part of a composition II which is prepared by mixing 61 parts of an α,ω-trimethylsiloxypoly(dimethyl/methylhydrogen)

17 siloxane having a content of Si-bonded hydrogen of 0.4% and a viscosity of 30 mm²/s and 39 parts of an α,ω-divinylpolydimethylsiloxane having a viscosity of 20,000 mm²/s.

The mixture is subsequently vulcanized for a period of 2 hours at 60° C. and the vulcanizate is examined. The results are shown in Table 10.

TABLE 10

| Vulcanisate | Shore A hardness | Tear propagation resistance [N/mm] | Tear strength [N/mm²] | Elongation at break [%] |
| --- | --- | --- | --- | --- |
| Example 11 | 42 | 27 | 5.7 | 350 |
| Example 12 | 41 | 28 | 5.5 | 370 |
| Comparative Example 7 | 41 | 25 | 5.3 | 390 |

EXAMPLE 12

Filler-containing, Addition-crosslinking 2-component System, e.g. for Molding or Coating 243 g of an α,ω-divinylpolydimethylsiloxane having a viscosity of 20,000 mm²/s are placed in the kneader described in Example 6. 186 g of hydrophobic, pyrogenic silica having a carbon content of 4.2% (prepared by the process described in DE-A 38 39 900 or the corresponding U.S. Pat. No. 5,057,151) are first metered in over a period of 5 minutes and then 157 g of resin powder B, whose preparation is described in Example 2, are metered in over a period of 3 minutes and during this procedure are mixed with the siloxane at 25° C. by kneading. The mixture is subsequently kneaded for 70 minutes with simultaneous heating, the final temperature being 150° C. The heating is then switched off and the mixture is admixed with a further 221 g of the abovedescribed siloxane, kneaded further for 20 minutes and finally degassed at a pressure of 300 hPa. The composition obtained has a viscosity of 875,000 mm²/s. 64.4 parts of the composition thus obtained are mixed with 34.6 parts of an α,ω-divinylpolydimethylsiloxane having a viscosity of 20,000 mm²/s, 0.5 parts of an inhibitor for regulating the pot life and platinum in the form of platinum-1,3-divinyl-1,1,3,3-tetramethyldisiloxane complex in such an amount that the resulting platinum content is 20 ppm, based on elemental platinum, with the mixture having a viscosity of 100,500 mm²/s and a residual toluene content of 0.009% (composition I).

10 parts of this composition I are treated as described in Example 11. The results are shown in Table 10.

COMPARATIVE EXAMPLE 7

Filler-containing, Addition-crosslinking 2-component System, e.g. for Molding or Coating The procedure described in Example 11 is repeated except that the mixture as described in Example 4e is replaced by the mixture described in Comparative Example C3c of resin solution V_B and α,ω-divinylpolydimethylsiloxane having a viscosity of 20,000 mm²/s, which has a residual toluene content of 0.8% according to ¹H-NMR. The mixture obtained has a viscosity of 99800 mm²/s and a residual toluene content of 0.25%.

10 parts of the mixture thus obtained are treated as described in Example 11. The results are shown in Table 10.

18

EXAMPLE 13

Silicone Gel 6 parts of the mixture obtained in Example 4e from resin powder B and α,ω-divinylpolydimethylsiloxane having a viscosity of 20,000 mm²/s, which has a residual toluene content of 0.028%, are mixed with 94 parts of an α,ω-divinylpolydimethylsiloxane having a viscosity of 980 mm²s, 0.025 parts of an inhibitor for regulating the pot life and such an amount of platinum in the form of a platinum-1,3-divinyl-1,1,3,3-tetramethyldisiloxane complex so as to result in a platinum content of 20 ppm, based on elemental platinum (composition Ia). Composition 13a has a residual toluene content of 0.0017%.

A composition having a makeup corresponding to the abovedescribed composition Ia is prepared by dissolving resin powder B in a mixture of the corresponding organopolysiloxanes by the process described in Example 4 and subsequently admixing the solution with inhibitor and platinum catalyst (composition Ib). Composition Ib has a residual toluene content of 0.0017%.

Composition Ia and composition Ib are each mixed in a weight ratio of 1:1 with a composition II which in turn is prepared by mixing 76 parts of an α,ω-dihydrogenpolydimethylsiloxane having a viscosity of 1030 mm²/s, 23 parts of an α,ω-divinylpolydimethylsiloxane having a viscosity of 980 mm²/s and one part of an α,ω-trimethylsiloxypoly(dimethyl/methylhydrogen)siloxane having a content of Si-bonded hydrogen of 0.18% and a viscosity of 210 mm²/s.

The two resulting mixtures are subsequently each cured for one hour at 100° C. to give sticky silicone gels which are suitable, for example, for embedding electronic components and the gels are examined. The results are shown in Table 11.

TABLE 11

| Vulcanisate | *Penetration [¹/₁₀ mm] | **Transmission [%] |
| --- | --- | --- |
| Composition Ia + II | 310 | 91.5 |
| Composition Ib + II | 307 | 91.0 |
| Composition C8a + II | 312 | 91.0 |
| Composition C8b + II | 306 | 92.0 |

*determined in accordance with DIN-ISO 2137
**determined on the compositions Ia, Ib, C8a and C8b for the respective vulcanizates at a wavelength of 700 nm (Spectronic 21 MV from Bausch & Lomb)

COMPARATIVE EXAMPLE 8

Silicone Gel

A composition having a makeup corresponding to the composition Ia described in Example 13 is prepared by mixing the mixture obtained in Comparative Example C3c from resin solution V_B and α,ω-divinylpolydimethylsiloxane having a viscosity of 20,000 mm²/s, which has a residual toluene content of 0.8% according to ¹H-NMR, with α,ω-divinylpolydimethylsiloxane having a viscosity of 980 mm²/s, inhibitor and platinum catalyst (composition C8a). Composition C8a has a residual toluene content of 0.0480%.

A composition having a makeup corresponding to the composition Ia described in Example 13 is prepared by dissolving the resin solution V_B in a mixture of the corresponding organopolysiloxane by the process described in Comparative Example 3 and subsequently admixing the solution with inhibitor and platinum catalyst (composition C8b). Composition C8b has a residual toluene content of 0.4000%.

The compositions C8a and C8b are treated as described in Example 13. The results are shown in Table 11.

What is claimed is:

1. An organopolysiloxane resin powder having a mean particle diameter of from 70 to 300 µm and a proportion of fine dust having a diameter <45 µm of less than 5 percent by weight, based on the total weight of the organopolysiloxane resin powder.

2. An organopolysiloxane resin powder as claimed in claim 1, having a particle diameter of at most 1000 µm.

3. An organopolysiloxane resin powder as claimed in claim 1 or 2, having a content of water-insoluble organic solvent of less than 0.15 percent by weight, based on the total weight of the organopolysiloxane resin powder.

4. An organopolysiloxane resin powder as claimed in claim 3, comprising $R_3SiO_{1/2}$ and $SiO_{4/2}$ units with a molar ratio of M to Q units in the range from 0.5:1 to 1:1, where R is an organic radical or a hydrogen atom.

5. A process for preparing an organopolysiloxane resin powder as claimed in claim 1 by spray drying in a spray dryer having a top and bottom end, an organopolysiloxane resin solution, which comprises atomizing a solution of organopolysiloxane resin which is solid at room temperature in an organic solvent at a temperature of from 0° to 100° C. and a pressure of from 1000 to 30000 hPa by means of a pressure nozzle at the top of a spray dryer and drying the liquid droplets produced by means of an inert gas which is conveyed in cocurrent and has an inlet temperature of from 100° to 300° C. to form resin particles, and producing a fluidized bed from the resin particles at the bottom of the spray dryer using a further inert gas stream which is introduced into the dryer from the bottom at an inlet temperature of from 50° to 250° C., wherein the resin powder is further dried and separated from fine dust by classification, with the fine dust being discharged in an upper part of the spray dryer and the resin powder of the present invention being discharged at a lower end of the spray dryer.

6. The process as claimed in claim 5, wherein a solution of organopolysiloxane resin which is solid at room temperature in an organic solvent is atomized at a temperature of from 20° to 60° C. and a pressure of from 10,000 to 20,000 hPa by means of a single-fluid pressure nozzle at the top of a spray dryer and the liquid droplets produced are dried by means of the nitrogen stream which is conveyed in cocurrent and has an inlet temperature of from 150° to 250° C., and a fluidized bed is produced from the resin particles at the bottom of the spray dryer using a further nitrogen stream which is introduced into the dryer from below at an inlet temperature of from 100° to 200° C., by means of which the resin powder is further dried and freed of fine dust by classification, with the fine dust thus separated off being discharged in the upper part of the spray dryer and the resin powder of the present invention being discharged at the lower end of the spray dryer.

7. The process as claimed in claim 5, wherein the solution of organopolysiloxane resin in an organic solvent has a resin content of from 30 to 80 percent by weight, based on the total weight of the resin solution.

8. A process for preparing an organopolysiloxane composition, which comprises mixing organopolysiloxane resin powder as claimed in claim 1 with an organosilicon compound.

9. The process as claimed in claim 8, wherein organosilicon compounds used are organopolysiloxanes having a viscosity of from 10 to $50 \cdot 10^6$ mm²/s at 25° C.

* * * * *